H. E. LA BOUR.
PUMPING SYSTEM.
APPLICATION FILED JULY 8, 1918.

1,314,875.

Patented Sept. 2, 1919.

Inventor
Harry E. La Bour
By Brown Hanson & Bottum
Attorneys

UNITED STATES PATENT OFFICE.

HARRY E. LA BOUR, OF CHICAGO, ILLINOIS, ASSIGNOR TO CHEMICAL EQUIPMENT COMPANY, OF CHICAGO, ILLINOIS, A CORPORATION OF ILLINOIS.

PUMPING SYSTEM.

1,314,875. Specification of Letters Patent. Patented Sept. 2, 1919.

Application filed July 8, 1918. Serial No. 243,852.

*To all whom it may concern:*

Be it known that I, HARRY E. LA BOUR, a citizen of the United States, residing at Chicago, in the county of Cook and State of Illinois, have invented a certain new and useful Improvement in Pumping Systems, of which the following is a full, clear, concise, and exact description, reference being had to the accompanying drawings, forming a part of this specification.

My invention relates to pumping systems and particularly relates to a system employing a centrifugal pump or other valveless pump for raising a fluid by suction.

I am aware that attempts have heretofore been made to employ a centrifugal pump or other valveless pump for sucking liquid through an intake pipe, but such attempts with which I have been familiar have not been successful because of complicated apparatus employed and the low efficiency of the system.

My invention aims to provide an improved pumping system in which a centrifugal pump or other valveless pump is employed as a motive element for raising fluid efficiently and easily.

It is known that after a centrifugal pump is once primed so that the intake is full of liquid, the pump will be able to exert a suction and will continue to raise the liquid. I have provided means for invariably priming the pump for filling a part of the intake so that the pump may exert a suction through the rest of the intake. I provide a tank between the first part of the intake which I term the suction pipe and the second part of the intake which is the intake of the pump. This tank acts as a gas and liquid trap between the two parts of the intake.

The capacity of this tank which forms the trap is such that the content of liquid trapped therein is greater than the volume of the air contained in the suction pipe and the top of the tank when said air is at a pressure less than the pressure of the atmosphere by the static head of the liquid column reaching from the end of the suction pipe to the point where said pipe enters the trap.

The discharge side of the pump is provided with a tank or conduit which will invariably trap sufficient liquid to substantially fill the lower tank or trap. Preferably this result is secured by putting a tank of the required size in the discharge main, but if the discharge main extends a sufficient pipe vertically, the contents of the same may be sufficient and a special tank in the discharge conduit will not be necessary. However, for the work which I employ my invention, namely, for emptying tank cars, the vertical height of the discharge pipe is generally not sufficient to secure this result so that I provide a special tank, which tank extends above the pipe and above the tank forming the trap.

With this apparatus I find that no check valves are necessary. In fact, in the preferred embodiment I employ only a single valve in the entire system. This valve is unnecessary for the normal running of the system and is provided only to permit disconnection of the pump for repairs. There is no danger of the liquid siphoning out of the system. If the suction pipe begins to clog it is necessary only to stop the pump and the liquid automatically expels the obstruction.

In order to teach those skilled in the art more particularly how to practise and construct the invention, I shall now set out in detail with the aid of the accompanying drawings one particular embodiment of my invention.

The centrifugal pump 1 which is preferably of the type disclosed in my copending application, Serial No. 221,644 filed March 11th, 1918, although any valveless pump may be employed in the present system, is mounted on a base 2 and driven by a motor 3 directly connected to the pump. The base 2 serves as a common mounting for the pump 1 and the motor 3.

The tank car or other source of liquid to be pumped is shown at 4 and it is from this source of liquid that it is desired to raise and discharge liquid by means of the centrifugal pump 1.

Figure 1:
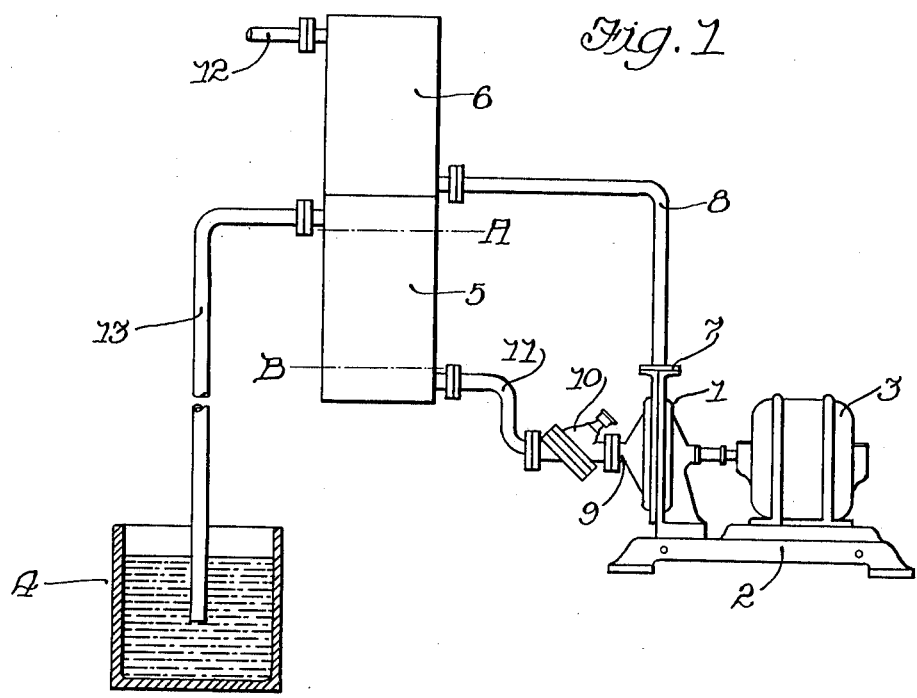
Figure 1 is a diagrammatic view of the preferred form of the invention.
Figure 2:
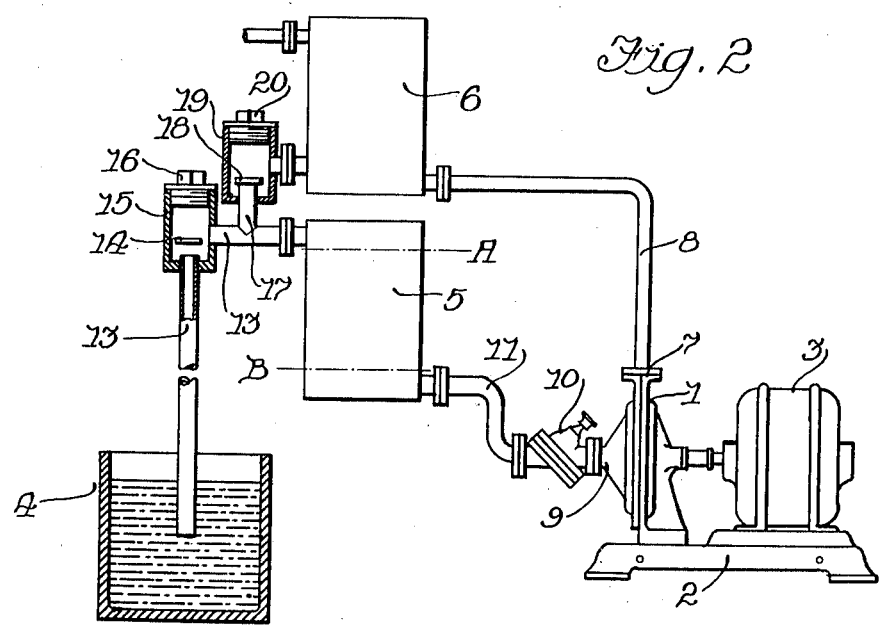
Fig. 2 is a similar view of a modification.

I provide a pair of closed tanks 5 and 6 which may be made integral as shown in Fig. 1 or separately as shown in Fig. 2. It is not essential that these tanks be exactly superimposed, but it is essential that the tank 6 extend to a higher level than the tank 5 in order that liquid may flow from the tank 6 to the tank 5, as will be described later.

The discharge nozzle or outlet 7 of the pump is connected by means of the pipe or conduit 8 to the bottom of the upper tank 6. The inlet 9 of the pump is connected through the valve 10 and the pipe or conduit 11 to the bottom of the lower tank 5.

The valve 10 is provided in order to permit the operator to shut off the pipe 11, if it should be desired to disconnect the pump from said tank. The valve is otherwise not necessary in the system, and is not employed in the normal operation thereof.

The discharge pipe 1 is connected to the top of the upper tank 6 and leads off to a receiving vat or any suitable receptacle for the liquid which is raised from the source 4. The suction pipe 13 is connected to the top of the trap 5 to discharge into said trap at its highest point.

The operation of the system as shown in Fig. 1 is as follows:

Liquid is first charged into the tank 6 or into the tank 5 for the initial operation of the system and thereafter a supply is always trapped automatically for priming the pump and starting the system. Assuming that the liquid in the tank 5, which is herein termed the trap, stands at substantially the level indicated by the broken line A, the suction pipe 13 is lowered into the source of liquid 4, such as a tank car or the like, which it is desired to empty, the pipe 13 being for this purpose preferably made flexible, and the motor is then started. As the speed of the motor picks up, the pump 1 will begin to discharge liquid from the trap 5 into the tank 6.

There is a particular relation between the contents of the trap 5 and the contents of the suction pipe 13 which are to be observed in order to secure proper working of the system.

The contents of the trap between the levels A and B must be slightly greater than the volume of air contained in the suction pipe 13 and in the trap 5 above the level A when said volume of air is expanded by the necessary reduction in pressure required to raise a column of liquid from the source 4 to the top of the suction pipe 13. The capacity of the tank 6 is substantially equal to the contents of the tank 5 between the levels A and B.

As the pump 1 lowers the liquid in the trap 5, the air within the top of the trap and the suction pipe 13 expands to fill the space, and in so doing drops in pressure. Before the intake pipe 11 of the pump 1 is uncovered, the pressure of the atmosphere will force the liquid from the source 4 through the suction pipe 13 and into the top of the trap 5 from where the liquid will fall through the body of air which is contained in the upper portion of the trap 5 and will then be drawn out by the pump 1 and discharged by way of the pipe 8, tank 6 and delivery pipe 12.

After the tank car 4 is emptied, or when sufficient fluid has been drawn from the source 4, the motor is stopped and the pump 1 ceases to operate. The liquid which is then contained in the tank 6 will flow back through the pipes 8 and 11 and through the pump 1 into the bottom of the trap 5 until the level of liquid stands at substantially the line A.

In case an obstruction is drawn into the suction pipe it is necessary only to stop the pump 1 and the flow of liquid from the tank 6 back to the trap 5 compresses the air held in said trap 5 until the obstruction is blown out of the suction pipe 13.

I have found that under certain conditions it is inadvisable to make the trap 5 large enough to contain the volume of air at reduced pressure where the suction pipe is relatively long. It is necessary to exhaust the air from the suction pipe in order to start the system and in such situations I employ the modification shown in Fig. 2. In this structure the suction pipe 13 contains the check valve 14 which is inclosed within the valve housing 15 and which valve housing may be closed by a plug 16.

A branch pipe 17 communicates with the suction pipe 13 and this branch pipe communicates with the tank 6. A check valve 18 held in a suitable valve housing 19 controls the communication between the tank 6 and the trap 5 by way of the branch pipe 17. It is not essential that the pipe 17 be formed as a branch of the pipe 13 as the only essential is that this pipe 17 form a valved connection between the tank 6 and the top of the trap 5. Otherwise the system shown in Fig. 2 is the same as that shown in Fig. 1. The operation of this form of the invention is as follows:

When the pump 1 is started, the level of the liquid in the trap 5 will be lowered, this lowering of the liquid will be insufficient to create enough drop in pressure of the air contained in the top of the trap 5 and in the suction pipe 13 to raise the liquid from the source 4 to the top of the suction pipe.

Consequently after the level of the liquid has been reduced and the pressure has been reduced in the suction pipe to as great an extent as this drop in level will allow, the pump 1 is stopped. The level in the suction pipe 13 will stand at some intermediate point and will be held there by means of the check valve 14. The check valve 18 remains firmly on its seat because of the greater pressure on the upper side of the same. When the pump is stopped, the liquid which has been transferred from the trap 5 to the tank 6 is now permitted to run back from the tank 6 to the trap 5 through the pump 1, and this return of the liquid now compresses the air caught in the upper part of the trap 5 and forces the same out through the horizontal part of the suction pipe 13 through the branch pipe 17 through the check valve 18 and up through the discharge tank 6. The pump 1 is again started and the liquid is drawn from the trap 5 and discharged into the discharge tank 6 creating a reduction in pressure which will raise the liquid still higher in the suction pipe 13. If necessary the steps may be repeated.

In each case, the liquid in the trap 5 acts as a piston which is pulled downward in the trap 5 which acts as a cylinder to cause a decrease in pressure enough to permit the atmospheric pressure on the liquid from the source 4 to force said liquid up through the suction pipe into the trap. It may be noted that the falling of the liquid through the body of air in the trap 5 tends to dissolve the same and carry the same away so that there is no tendency for the pump to become gas bound even though there might be a slight leak in the suction pipe.

It is not essential that the tanks or other parts of apparatus be fixed in position. It is essential to the invention only that they occupy certain relations at certain times in order to secure the individual functions above outlined.

I do not intend to be limited to the precise details of construction as shown and described, as it is apparent that the particular proportions and parts of apparatus may be varied within the skill of the workmen except as to the necessary proportions and locations which I have above indicated, and which are contained as limitations in the appended claims.

I claim:

1. In combination, a closed liquid and gas trap, a pump connected on its intake side to the bottom of said trap, and arranged at a lower level than the trap so that liquid in the trap can flow freely into the pump to prime same, and a suction pipe connected to the top of said trap.

2. In combination, a pump, an intake tank, a discharge tank, said pump having its intake connected to the bottom of the intake tank and its discharge connected to the bottom of the discharge tank, said connections being open for liquid flow in either direction, and a suction pipe connected to the top of the intake tank.

3. In combination, a valveless pump, a pair of tanks having their bottoms connected by said pump, means for delivering liquid to the top of one tank, and means for delivering liquid from the top of the other tank, said other tank extending above the one tank and above the pump.

4. In combination, a valveless pump, a liquid and gas trap, an intake pipe for the pump connected to the bottom of said trap, a suction pipe connected to the top of the trap and a tank, the discharge of the pump being connected to the bottom of said tank, said tank extending above said trap and said pump extending below said tank and not above said trap.

5. In combination, a liquid and gas trap, a suction pipe connected to the top of said trap, a valveless pump having its intake connected to the bottom of said trap whereby the liquid in said trap can flow freely into the pump to prime same, and a discharge conduit for the pressure side of the pump, said conduit being adapted to trap liquid for substantially filling said trap, the pump and connections forming a free passage for the trapped liquid from the conduit back to the trap.

6. In combination, a discharge tank, a trap, a suction pipe communicating with the top of the trap, a valveless pump connecting the bottom of the trap with the bottom of the discharge tank, said trap being of a volumetric capacity greater than the volume of the air contained in the suction pipe and the top of the trap when said air is at a pressure sufficiently less than atmosphere to raise liquid through the suction pipe into the trap.

7. In combination, a discharge tank, a trap below said discharge tank, a suction pipe discharging into said trap and a pump connecting said discharge tank with said trap, the volumetric capacity of said trap being greater than the volume of the air contained in the suction pipe when reduced to a pressure less than atmosphere by the static head of the column of liquid in the suction pipe.

8. In combination, a trap, a tank above the trap, a pump connecting the bottom of the tank with the bottom of the trap to draw liquid from the trap and discharge the same into the tank, a suction pipe extending from the top of the trap, said suction pipe having a check valve opening toward the trap and a branch connection leading from the suction pipe through the tank, said branch containing a check valve opening toward the tank.

9. In combination, a trap, a tank above the trap, a valveless pump having its inlet connected to the bottom of the trap and discharge connected to the bottom of the tank, a suction pipe communicating with the trap, said suction pipe having a check valve and means for establishing connection between the top of the trap and said tank, said means including a check valve opening toward the tank.

10. In a pumping system of the character described, the combination with a valveless pump, of an intake tank at a higher level than the pump, the intake of the pump connected to the bottom of the intake tank, a suction pipe connected to the top of the intake tank, a delivery tank above the level of the intake tank, the delivery of the pump connected to the bottom of the delivery tank, and an outlet at the top of the delivery tank whereby all of the liquid trapped in the delivery tank is free to return to the intake tank through the pump upon the stopping of the pump.

11. In combination, a trap, a tank above the trap, a valveless pump having its inlet connected to the bottom of the trap and its outlet connected to the bottom of the tank, a suction pipe extending from the top of the trap, said suction pipe having a check valve and means for establishing communication between the trap and the tank and adapted to permit the escape of gas from the trap and from the portion of the suction pipe between the trap and check valve therein, to said tank, said means including a check valve opening toward the tank.

In witness whereof I hereunto subscribe my name this 3d day of July 1918.

HARRY E. LA BOUR.